United States Patent [19]

Volakakis

[11] Patent Number: 4,512,248
[45] Date of Patent: Apr. 23, 1985

[54] ROTISSERIE COOKER

[76] Inventor: Dinos G. Volakakis, 6905 Cleaton Rd., Apt. C-1112, Columbia, S.C. 29206

[21] Appl. No.: 572,853

[22] Filed: Jan. 23, 1984

[51] Int. Cl.³ .............................................. A47J 37/04
[52] U.S. Cl. ..................................... 99/341; 99/421 V; 99/447; 126/41 A; D7/331
[58] Field of Search .................. 99/419, 421, 341, 447; 126/41 A; 426/523; D7/331

[56] References Cited

U.S. PATENT DOCUMENTS

| | | | |
|---|---|---|---|
| D. 245,566 | 8/1977 | Tomaras | D7/331 |
| 1,719,713 | 7/1929 | Miller | 99/421 V X |
| 2,179,646 | 11/1939 | Spartalis | 99/341 X |
| 2,549,019 | 4/1951 | Saunders | 99/341 X |
| 4,256,084 | 3/1981 | Engleman . | |
| 4,270,444 | 6/1981 | Geissmann | 99/341 X |
| 4,297,986 | 11/1981 | Lehrer . | |

Primary Examiner—Billy J. Wilhite
Attorney, Agent, or Firm—Luke J. Wilburn, Jr.

[57] ABSTRACT

An improved rotisserie cooker having a multi-sided base, a vertical spit mounted for rotation thereon and upstanding tapered wall sections and a roof section forming a cooking area, heating means on the rear walls of the cooker and a pair of bifold closure doors for the front opening of a cooking compartment, each bifold door comprising a solid side panel and a front panel having a window therein, each side and front panel tapering upwardly to define with the base and wall sections of the cooker an external shape of generally hexagonal cross-section throughout the height of the cooker.

4 Claims, 5 Drawing Figures

ROTISSERIE COOKER

This invention relates to an improved rotisserie cooker, and, more particularly, to an improved rotisserie cooker of the vertical spit type useful for heating and cooking a prepared meat product in a restaurant location.

BACKGROUND OF THE INVENTION

It is known to provide a rotisserie cooker for restaurant operations having a vertical spit on which a food product is rotated as heat from a source adjacent the spit is directed thereon to cook the food. One such rotisserie cooker construction is shown in U.S. Pat. No. Des. 245,566 which discloses a rotisserie cooker having a hexagonal base with wall sections tapering inwardly and upwardly from four sides of the base to define, with a roof section, an open front cooking area above the base. Mounted centrally on the base and extending upwardly therefrom is a vertical, rotatable spit having a circular base plate which receives and supports a meat product to be cooked. Located on two wall sections of the cooker and extending upwardly alongside the spit are a pair of gas-fired burners which radiate heat forwardly to heat the meat as it is rotated on the vertical spit.

Rotisserie cookers of the type shown in the aforesaid design patent typically are employed in a fast food restaurant to cook a meat preparation used in specialty sandwiches known as Gyros sandwiches. The cooker generally is located on a food preparation counter of the restaurant adjacent an overhead exhaust which removes smoke and other cooking by-products from the area. In using the cooker, the meat to be cooked is rotated on the rotisserie spit in front of the heating units. When it is desired to prepare a serving from the meat on the spit, the food preparer uses a sharp knife to shave or carve thin portions of meat directly from the body of meat on the spit. To obtain thin, uniform slices of meat from the main body of the meat, the access to the cooking area of such cookers must be large and substantially wide to expose the sides of the meat on the spit and allow full manipulation of the cutting knife thereabout.

In use of rotisserie meat cookers of the type described in fast food restaurant operations, the cooker is operated relatively continously to keep the meat hot for serving food products at various times. Because of the large open front of the cooker, the food is exposed to the surrounding environment. In addition, a considerable amount of heat loss occurs during the cooking operation, not only decreasing the efficiency of the cooking operation but creating excess heat in the immediate vicinity of the cooker. Such excess heat is very uncomfortable for personnel in the working area of the cooker, particularly when the cooker is located in a food preparation area of limited size.

BRIEF OBECTS OF THE PRESENT INVENTION

It is therefore an object of the present invention to provide an improved rotisserie cooker of the type described having closure doors to contain heat within the cooking area of the cooker.

It is another object to provide an improved rotisserie cooker of the type described having closure doors for the cooking area to enclose the same to protect food products in the cooking area from outside contamination and to retain heat within the cooking area to greatly decrease cooking time and increase cooking efficiency of the cooker.

It is a further object to provide an improved rotisserie cooker of vertical spit type having closure doors for the cooking area of the cooker to retain heat and facilitate the retention of cooking juices and natural flavors in the meat product on the spit.

It is still another object to provide closure doors for the rotisserie cooker to define a cooking compartment to retain heat within the cooker and greatly reduce heat in the working environment around the cooker for the improved comfort of personnel.

It is another object to provide a vertical spit rotisserie cooker with closure doors defining a cooking compartment, wherein the closure doors are quickly detachable from the cooker for cleaning.

It is another object to provide an improved rotisserie cooker of the type described having closure doors to define a cooking compartment for the cooker which can be widely opened to provide free access to the interior of the compartment for carving portions of food products directly from the rotisserie spit.

It is a more specific object to provide an improved rotisserie cooker of polygonal shape having pairs of bifold closure doors designed for substantial enclosure of all sides of a food product in a cooking compartment of the cooker to protect the food during cooking while permitting ready access to the food on the rotisserie spit of the cooker for carving portions therefrom for consumption.

It is a further specific object to provide an improved rotisserie meat cooker having vertical rotatable spit contained within a cooking compartment of the cooker with closure doors to contain heat within the compartment, provide clear view of the food in the compartment, and provide wide access to the food for carving serving portions of the same.

BRIEF DESCRIPTION OF THE DRAWINGS

The above as well as other objects of the present invention will become more apparent, and the invention will be better understood, from the following detailed description of preferred embodiments of the invention, when taken together with the accompanying drawings, in which.

DETAILED DESCRIPTION OF PREFERRED EMBODIMENTS

Figure 2:
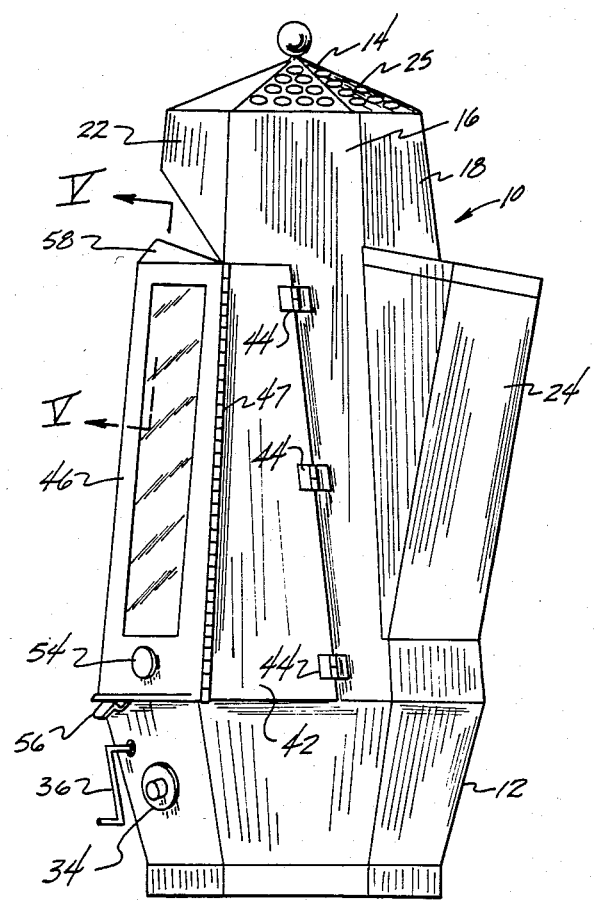
FIG. 2 is a right side elevation view of the cooker of FIG. 1.

Referring more particularly to the drawings, the improved rotisserie cooker 10 of the present invention comprises a base 12 of hexagonal horizontal cross-section. Extending upwardly from four adjacent sides of the hexagonal base 10 and tapering upwardly and inwardly to a roof portion 14 of the cooker are four generally symmetrical wall sections, two of which 16, 18 are seen in FIG. 2. The four wall sections form side and rear walls of an open front cooking area. Extending downwardly from front panels 20, 21 of the roof section of the cooker are short wall panels 22 which form an inverted upper V-shaped edge of the open front of the cooking area. Overlying a lower portion of the two rear wall sections of the cooker, as seen in FIG. 2, is a protruding spaced wall portion 24 which has upper openings therein (not shown) to provide an air passage into the lower part of the cooking area adjacent the base 12. The rear triangular roof panels of roof section 14 have openings 25 through which heat and cooking by-products can exhaust from the cooking area. The base, wall sections, and roof may be formed of suitable high strength, heat resistant material, such as stainless steel.

Figure 3:
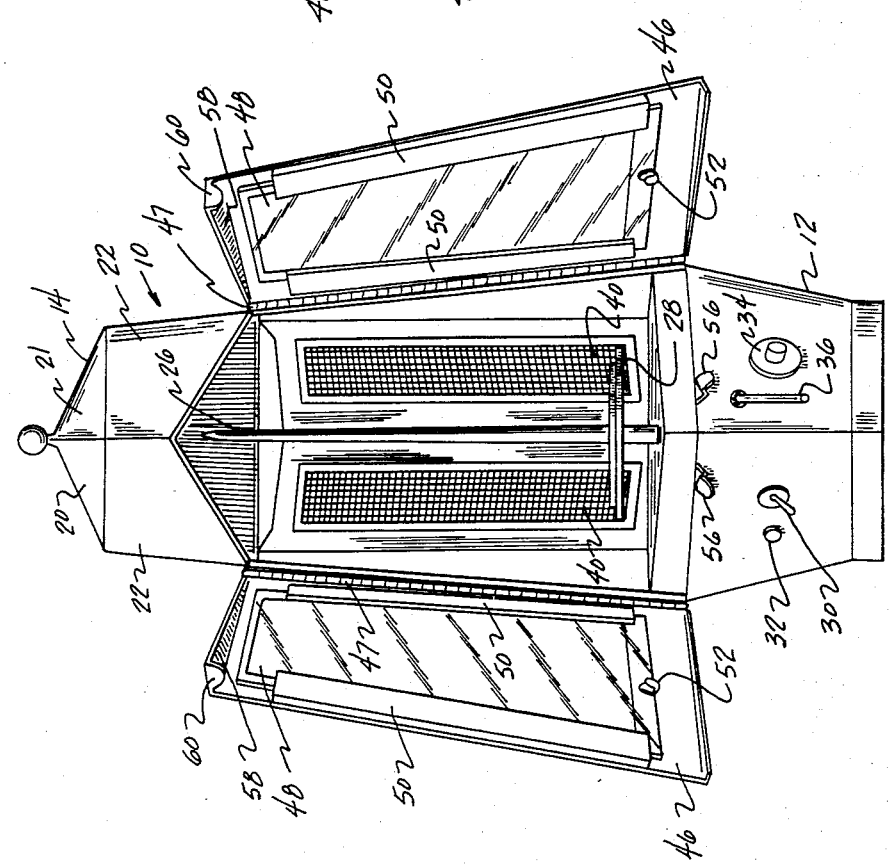
FIG. 3 is a front elevation view of the cooker of FIG. 1, with the pair of bifold doors defining the cooking compartment partially open to better show the interior of the cooking compartment.
Figure 4:
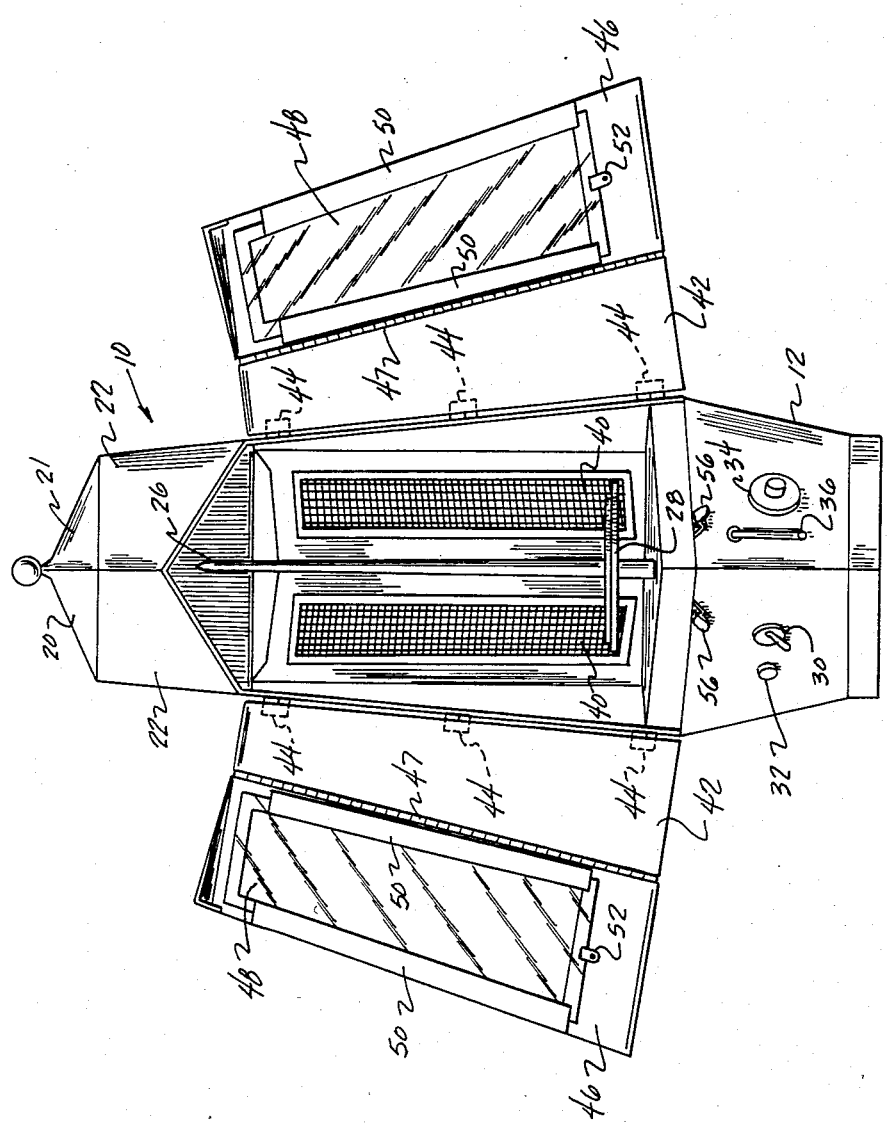
FIG. 4 is a front elevation view of the cooker of FIG. 1 showing the pairs of bifold doors for the cooking compartment in a further opened position from that shown in FIG. 3.

As is best seen in FIG. 3, mounted on and extending upwardly from the central portion of base 12 of the cooker is a vertical spit 26 having a lower horizontal plate 28 for support of a meat product, such as a specially prepared lamb and beef meat composition, used in Gyros sandwiches. An electric motor, not shown, is located in the base 12 for rotating the spit 26. The front face panels of the base 12 contain an electric switch 30, an indicator light 32, a heat control dial 34, and a crank 36 for moving the spit horizontally forwardly or rearwardly in a horizontal slot of the base 12 to position the meat on the spit closer to or further away from two vertically extending heating units 40 located on the rear interior wall surfaces of the cooker. The heating units 40 shown are gas-fired burners although other heating means may be employed for the cooker.

The foregoing explanation describes the general construction of the prior art vertical spit cooker shown in U.S. Pat. No. Des. 245,566 referred to herein.

Figure 1:
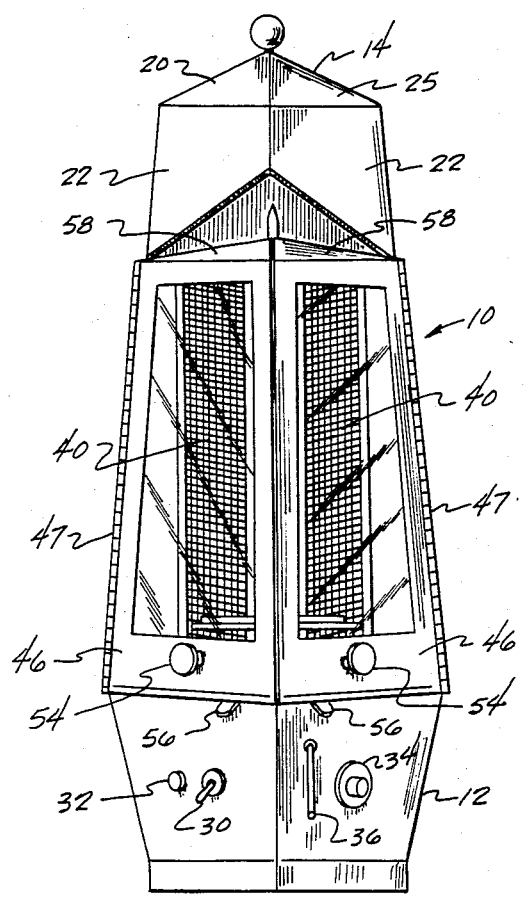
FIG. 1 is a front elevation view of the improved rotisserie cooker of the present invention.

The improvement in the cooker which forms the present invention comprises a pair of bifold doors for the cooking area to define with the side and roof sections a cooking compartment of the cooker. Each bifold door has a solid side panel 42 connected by hinges 44 to a side wall section 16 of the cooker, and a front panel 46 having a heat resistant glass window, such as pyrex glass, 48 therein. The adjacent side edges of the front and side panel 46, 42 of each bifold door are interconnected by a continuous hinge, such as a piano hinge 47, while hinges 44 are of a quick release type to permit ready removal of the bifold doors from the cooker by upward sliding of door panels 42 off the pins of hinge 44 for ease of cleaning. The bottom edges of the side and front panels 42, 46 of each of the bifold doors engage two adjacent sides of the hexagonal base 12 of the cooker. As can be seen, the panels 42, 46 taper upwardly and inwardly, and terminate in upper edges which are spaced below the upper edge of the opening into the cooking compartment (FIG. 1) to allow passage of air in the upper portion of the compartment.

The window pane 48 of each front panel 46 of each bifold door is received in vertical guideways 50 on the interior of the panel, and are supported in place by a single screw and clamp 52 engaging the lower edge of the pane. The single screw and clamp may be easily loosened and removed to release the glass pane 48 from the guideways 50 for periodic cleaning or replacement. Panes 48 are somewhat loosely held in guideways 50 to permit expansion and contraction of the glass due to heat.

Screw and clamp 52 also holds a handle or knob 54 on the lower front face of each front panel. The handles 54 are used to open and close the bifold doors of the cooking compartment. The bifold doors are held in closed position by a pair of spring elements 56 which extend from the sides of the base 12 to frictionally engage the lower edges of the front door panels 46. The springs 56 release the door panels when the handles 54 are pulled outwardly. The door panels 42, 46 may thus be pivoted rearwardly about their hinges 44, 47 in a double fold arrangement to lie well behind the opening of the cooking compartment. In fully open position, the bifold doors thus permit free access to the meat in the cooking compartment from both front and sides of the cooker, enabling the food preparer to carve meat from the body of meat on spit 26 about an arc of approximately 180 degrees.

As seen in FIG. 2, the solid side panels 42 of each bifold doors overlie portions of the side wall sections 16 of the cooking compartment. Both the front and side panels of the bifold doors may be formed of suitable high strength, heat resistant materials, such as stainless steel, and taper upwardly and inwardly to provide a generally hexagonal horizontal cross sectional appearance for the cooker.

Figure 5:
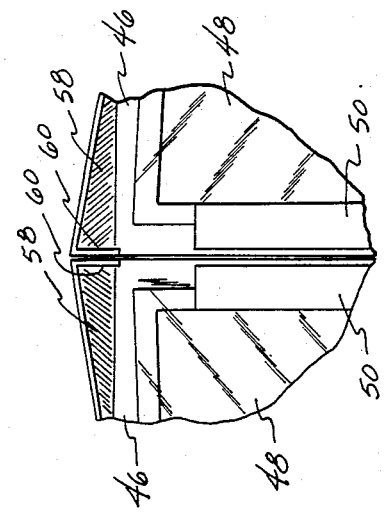
FIG. 5 is an enlarged interior view of the upper portion of the two front panels of the pair of bifold doors of the cooker, looking in the direction of the arrows V—V of FIG. 2, and showing the abutting relation of the edges of the panels in closed position.

As best seen in FIGS. 3 and 5, the upper edge portions 58 of the front door panels 46 are inwardly bent from the plane of the panel and have a flanged ear portion 60. The edge portions 58 provide additional strength for the doors and ear portions 60 of the front door panels abuttingly engage each other (see FIG. 5) when the bifold doors are closed to support and align the doors in the cooking compartment opening.

From the foregoing description of a preferred embodiment, it can be seen that the provision of bifold doors to enclose the cooking spit of open front, vertical spit cookers and broilers of the general type described provides containment of heat within the cooker adjacent the meat to increase cooking efficiency, and provides improved comfort to restaurant personnel while permitting continous viewing of the meat and free access to the meat.

That which is claimed is:

1. In a rotisserie cooker having a multi-sided base, wall sections attached to and extending upwardly from sides of the base to define with a roof section an open front cooking area, a rotatable spit centrally mounted on the base and extending vertically upward in the cooking area for supporting food to be cooked, and heating means on an inner surface of the wall sections for radiating heat onto food on the spit to heat the same, the improvement therewith comprising door means for closing a major portion of the open front of the cooking area to define with the wall sections a cooking compartment to facilitate the cooking of food and the comfort of personnel in the area of the cooker, said door means comprising a pair of bifold doors, each bifold door having an upwardly extending side panel and an upwardly extending front panel with window to permit viewing of the interior of the cooking compartment, hinge means pivotally interconnecting adjacent upstanding side edges of the side and front panels of each bifold door, and hinge means pivotally connecting the other upstanding side edge of each side panel to a respective wall section of the cooker which defines a side of the opening into the cooking compartment, each panel of each bifold door having a lower edge for engaging an upper edge of a side of the multi-sided base of the cooker and each front panel having a free upwardly extending side edge for engaging the other front panel side edge to close the front of the cooking compartment opening when the doors are in closed position, and the door panels having upper edges located below the roof section of the cooker when the free side edge of each front panel of each bifold door engages the other to define an upper opening from the compartment.

2. A rotisserie cooker as defined in claim 1 including a handle located on a lower portion of each front panel of each bifold door to open and close the same, and means attached to an upper edge of the base of the cooker to frictionally retain the front panel doors in closed position and to release the same from closed position when force is exerted on said handles to open the bifold doors.

3. A rotisserie cooker as defined in claim 1 wherein said base is hexagonal in shape, and side edges of each of said door panels taper upwardly to provide an enclosure of the cooking compartment which is generally hexagonal in horizontal cross section throughout the height of the doors and of symmetrical upwardly tapering appearance.

4. A rotisserie cooker as defined in claim 1 wherein an upper edge portion of each front panel is inwardly bent from the plane of the panel, and a flanged ear portion depending therefrom to abuttingly engage the ear portion of the other front panel to support and align the doors in closed position.

* * * * *